Figure 3:
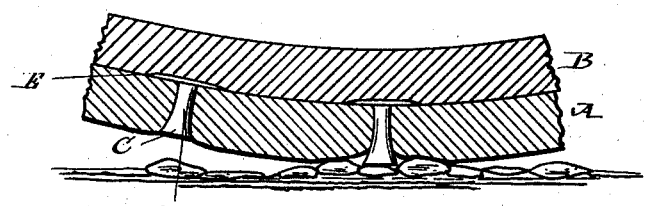

No. 609,318. Patented Aug. 16, 1898.
C. T. ADAMS.
VEHICLE TIRE.
(Application filed June 16, 1897.)
(No Model.)

WITNESSES:

INVENTOR
BY
ATTORNEY.

THE NORRIS PETERS CO., PHOTO-LITHO., WASHINGTON, D. C.

UNITED STATES PATENT OFFICE.

CALVIN THAYER ADAMS, OF NEW YORK, N. Y.

VEHICLE-TIRE.

SPECIFICATION forming part of Letters Patent No. 609,318, dated August 16, 1898.

Application filed June 16, 1897. Serial No. 640,971. (No model.)

*To all whom it may concern:*

Be it known that I, CALVIN THAYER ADAMS, a citizen of the United States, residing in the city, county, and State of New York, have invented a new and useful Improvement in Vehicle-Tires; and I do hereby declare that the following is a full, clear, and exact description of the same.

My invention relates to means for preventing the pneumatic or cushioned tires of bicycles and other wheeled vehicles from slipping on the roadway, as they are particularly apt to do when the roadway is smooth and wet.

It has been heretofore proposed to provide the cushioned tires of bicycles with peripheral spikes protruding from the surface of the tread, so as to penetrate the roadway and give the wheel a locking engagement therewith. The penetration, however, greatly increases the labor of propulsion, and the spikes break off. It has also been suggested to fit solid-cushioned tires with external metallic fittings to bear on the ground when the tire is compressed; but such fittings would be too heavy, expensive, and complicated for practical use. Crude ideas have been presented, as in United States Patent No. 5,104, for protecting the treads of elastic tires from wear by covering them with metallic rivets held by inside washers, the heads of which rivets projecting on the outside of the tread would make contact with the roadway and being close together would keep the elastic fabric of the tread from much contact with and hence wear from the roadway; but the use of washers on the inside of said rivets would evidently be utterly impractical owing to the expense of their application, and the washers, together with the ends of the rivets riveted thereon, would project too far on the inside of the tread and soon destroy the tire against which they would bear, while, what is more important still for my purpose, the heads of the rivets on the outside of the tread being designed to project far enough to keep the elastic material of the tread off the ground, and thus save wear, would from that very fact cause the wheel to ride roughly and to slip on smooth surfaces owing to the avoidance of the contact and adhesion between the rubber or elastic material of the tread and the ground, which adhesion is an essential feature and function of the elastic tire.

The problem to be solved by my invention was thus to provide a durable tread for pneumatic or other cushioned tires which would avoid the practically prohibitive faults of the ideas above briefly referred to, and especially would prevent the rubber or elastic material of the tread from slipping on wet or smooth pavements without at the same time affecting the important function of such elastic material in making full adhesive contact with the roadway at all times. I had further to avoid any material increase of the weight or expense of the tire and must not stiffen or decrease its essential elasticity and cushioning quality. I believe I have attained all these ends by my invention, which in its entirety and in its preferred form consists of a tread for a pneumatic or cushioned tire made of soft or vulcanized elastic fabric or material studded on its bottom and side bearing-surfaces with flat-headed metallic rivets driven through the tread from the inside and clenched on and against the outside of the yielding fabric or material of the tread, so as to slightly draw in and depress said fabric or material immediately around the clenched outer ends of the rivets and form hard bearing and biting heads level with or just inside the normal bearing-surface of the tread. The elastic fabric or material of the tread is thus allowed to make full adhesive contact with the surface of the roadway, and the lightness, elasticity, and economy of the tire is preserved, while the depressed, rough, or sharp-sided upset ends of the rivets, securely fixed in the tread, come into contact with the roadway as the elastic fabric or material of the tread and tire is compressed under the weight and form durable bearing and biting heads which successively engage the roadway and effectually prevent the wheel from slipping thereon, however wet the surface.

In order that my invention may be fully understood in all its features, I shall first describe in detail the mode in which I have carried the invention into practice and then point out the features of the invention in the claim.

Reference is to be had to the accompanying drawings, forming part of this specification, in which the same parts are designated by like letters in all the figures.

Figure 1:
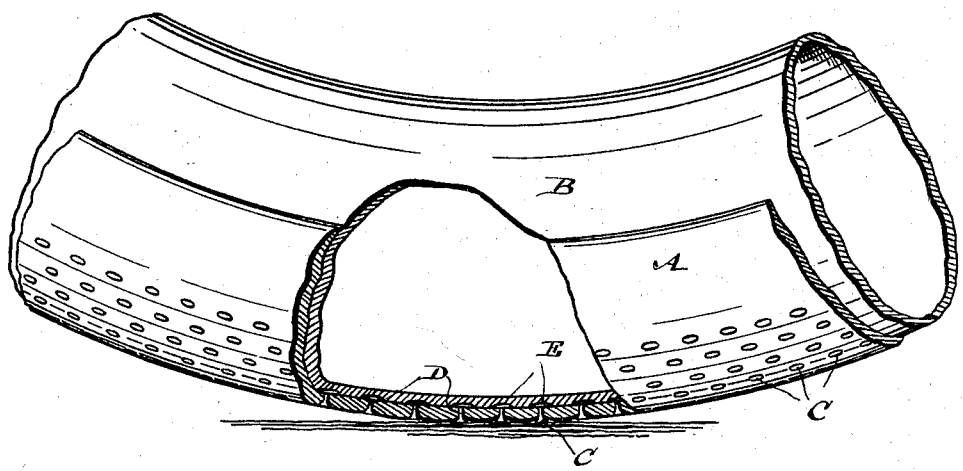
Figure 2:
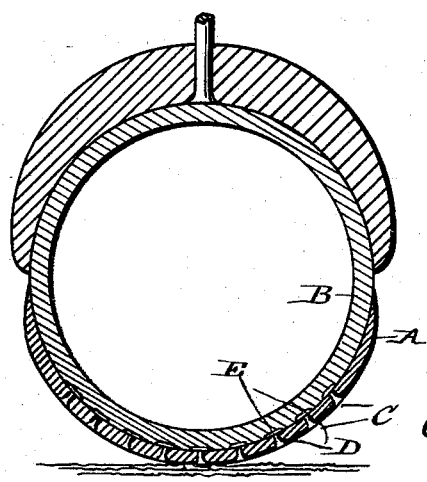

Figure 1 is a longitudinal sectional view of a portion of a pneumatic single-tube bicycle-tire embodying my invention. Fig. 2 is a cross-sectional view of the same. Fig. 3 is an enlarged sectional side view.

In equipping a single-tube rubber pneumatic bicycle-tire with my invention I prefer to employ a tread A of vulcanized fabric to encircle the tire B and of a width to cover the bottom and side bearing-surfaces of the tire, which tread, after being provided with the antislip-heads C, as hereinafter described, I securely cement on the tire; but I may fix the antislip-heads in a detachable tread laced around the inner tube or in the outer tube of a double-tube tire or in a separate tread cemented on the outer tube.

I stud the tread A before application to the tire by preference with headed rivets D, the shanks of which are driven through the yielding or elastic fabric or material of the tread and by preference clenched tightly on as well as against the outside of the fabric or material, so as to slightly compress and depress the fabric or material immediately around the clenched ends of the rivets D, which clenched and upset ends form the antislip-heads C.

I prefer to have the antislip-heads C extend over the bottom and side bearing-surfaces of the tread and to lie in such proximity to each other that several, at least, of them will always be in engagement with the surface of the ground when in action, and yet they will leave a large extent of the intervening bearing-surface of the yielding fabric or material of the tread presented slightly outside or level with said heads when not in action, and thus free to make full adhesive contact with the ground when in action. For thus applying the rivets D to the tread A, I may use the automatic machine illustrated in another application for patent by Charles L. Fitch, to which application reference may be had.

The heads E of the rivets D lying against the inside of the tread A and bearing against the tire B when the tread is applied thereto, together with the upset clenched ends C of the rivets on the outside of the tread, hold the rivets securely against displacement, while the flat integral heads E lying against the inside of the tread will not in any wise injure the tire B, against which they also bear. The rivets D are easily and at slight expense thus clenched in the tread A—as, for example, by means of the automatic machine referred to. The clenched and upset ends or heads C of the rivets on the outside of the tread being somewhat sharp-sided, as indicated on the drawings, materially assist in causing the heads C to catch laterally on, as well as make contact with, the surface of the roadway, and yet do not penetrate the same so as to impede progress or increase the labor of propulsion. Further, and what is an important feature of my invention, the heads C being, as before explained, level with or slightly depressed below the bearing-surface of the tread, permit the yielding material of the tread to make the essential firmly-adhesive contact with the roadway, and yet, owing to the elasticity of the tire B, backing the heads C, the yielding material of the tread recedes under the pressure and allows the heads to make the effective bearing and catching contact with the surface of the roadway.

By long-continued use of a tire improved as described I find it even more fully effective in practice to prevent slipping than even the foregoing explanation would indicate, and I ascribe part of the peculiar efficiency of this tread to the fact that the sharp-sided upset ends D of the rivets work in the tread when in action something like miniature plungers, the surface of the tread receding and leaving the sides of the upset ends exposed, so as to catch sidewise on the inequalities of the roadway.

While some of the economical and practical advantages peculiar to the invention may be obtained by using headed rivets unclenched, whose heads bear directly against the inner surface of the tread, the level exposed ends on the outside acting similarly to the clenched heads D, I achieve far better results with the clenched heads on the outside for the reasons above set forth.

I have tried securing the rivets in the tread with the integral heads on the outside and the shanks clenched over washers on the inside, as suggested in Patent No. 5,104, before referred to, for covering the tread and keeping it off the ground; but I found that not only was this means absurdly expensive and impractical, but also that if the washers were thin the rivets pulled out in use while if thick washers were used and the upsetting was considerable the resulting large projections on the inside of the tread soon destroyed the tire against which it bore, as well as added entirely too much weight and roughness to the tire. Of course my antislip-rivets are otherwise very different from the covering-rivets suggested in said patent, as my antislip-rivets are dispersed and fixed practically level with or below the normal bearing-surface of the tread, so as to allow the material of the tread to be fully presented to the ground, while in said Patent No. 5,104 no attempt is made to sink or disperse the outside heads of the rivets. They, on the contrary and purposely, project wholly outside the tread and are closely clustered, so as to keep the tread from wearing on the ground.

I claim as my invention—

A pneumatic or cushioned vehicle-tire having an outer fabric-ply studded with rivets having integral heads on both ends bearing against opposite sides of said fabric-ply.

In testimony whereof I have hereunto set my hand the 14th day of January, 1897.

CALVIN THAYER ADAMS.

In presence of—
CLARENCE L. BURGER,
HERMAN MEYER.